US011345382B2

(12) United States Patent
Xia et al.

(10) Patent No.: US 11,345,382 B2
(45) Date of Patent: May 31, 2022

(54) PALLET TRUCK

(71) Applicant: HANGCHA GROUP CO., LTD., Zhejiang (CN)

(72) Inventors: Zhongnan Xia, Zhejiang (CN); Hao Kuang, Zhejiang (CN); Pengfei Pan, Zhejiang (CN); Xing Luo, Zhejiang (CN); Le Shang, Zhejiang (CN); Jianchen Sun, Zhejiang (CN); Jingxuan Ruan, Zhejiang (CN)

(73) Assignee: HANGCHA GROUP CO., LTD., Zhejiang (CN)

( * ) Notice: Subject to any disclaimer, the term of this patent is extended or adjusted under 35 U.S.C. 154(b) by 197 days.

(21) Appl. No.: 16/736,834

(22) Filed: Jan. 8, 2020

(65) Prior Publication Data
US 2020/0317244 A1 Oct. 8, 2020

(30) Foreign Application Priority Data

Apr. 8, 2019 (CN) .......................... 201910276376.8
Apr. 8, 2019 (CN) .......................... 201910276377.2
Apr. 8, 2019 (CN) .......................... 201910276389.5
Apr. 8, 2019 (CN) .......................... 201920464953.1
(Continued)

(51) Int. Cl.
*B62B 3/06* (2006.01)
(52) U.S. Cl.
CPC .................................. *B62B 3/0625* (2013.01)
(58) Field of Classification Search
CPC ................................ B62B 3/0625; B62B 3/12
See application file for complete search history.

(56) References Cited

U.S. PATENT DOCUMENTS

2005/0116432 A1* 6/2005 Borrmann .............. B62B 3/0618
280/43.12
2020/0269896 A1* 8/2020 Kalinowski ........... B62B 3/0618

FOREIGN PATENT DOCUMENTS

| CN | 202829475 U | 3/2013 |
| CN | 204569329 U | 8/2015 |
| CN | 105947933 A | 9/2016 |

(Continued)

OTHER PUBLICATIONS

First Office Action dated Feb. 6, 2020 for Chinese patent application No. 201910276389.5, English translation provided by Global Dossier.

*Primary Examiner* — Saul Rodriguez
*Assistant Examiner* — Willie Berry, Jr.
(74) *Attorney, Agent, or Firm* — Yue (Robert) Xu; Apex Attorneys at Law, LLP

(57) ABSTRACT

A pallet truck according to the present application includes a front frame, a rear frame, a lifting component, two fork bodies, a guide bar, a transmission device, and a load-bearing wheel assembly. The distance between the fork bodies can be adjusted by using the side-shifting driving component, thereby providing different fork distances and significantly improving the adaptability. During the adjusting process, the transmission device can switch the load-bearing wheel assembly from the longitudinal rolling state to the lateral rolling state, thereby avoiding wear of the wheels, which is beneficial to improving the overall life of the device and reducing the maintenance cost. In addition, the transmission device is pushed out as the rear frame is lifted, and thus the operation process is simple and reliable.

19 Claims, 9 Drawing Sheets

(30) Foreign Application Priority Data

Apr. 8, 2019 (CN) .......................... 201920465115.6
Apr. 8, 2019 (CN) .......................... 201920465973.0

(56) References Cited

FOREIGN PATENT DOCUMENTS

| | | |
|---|---|---|
| CN | 106219451 A | 12/2016 |
| CN | 106629499 A | 5/2017 |
| CN | 206692269 U | 12/2017 |
| CN | 208577394 U | 3/2019 |

\* cited by examiner

PALLET TRUCK

CROSS REFERENCE TO RELATED APPLICATION

The present application claims the benefit of priorities to the following Chinese patent applications:

No. 201910276376.8 titled "FORK DEVICE OF PALLET TRUCK" and filed with the China National Intellectual Property Administration on Apr. 8, 2019;

No. 201910276377.2 titled "LOAD-BEARING WHEEL ASSEMBLY OF PALLET TRUCK" and filed with the China National Intellectual Property Administration on Apr. 8, 2019;

No. 201910276389.5 titled "PALLET TRUCK" and filed with the China National Intellectual Property Administration on Apr. 8, 2019;

No. 201920464953.1 titled "FORK DEVICE OF PALLET TRUCK" and filed with the China National Intellectual Property Administration on Apr. 8, 2019;

No. 201920465115.6 titled "PALLET TRUCK" and filed with the China National Intellectual Property Administration on Apr. 8, 2019;

No. 201920465973.0 titled "LOAD-BEARING WHEEL ASSEMBLY OF PALLET TRUCK" and filed with the China National Intellectual Property Administration on Apr. 8, 2019;

the entire disclosures of which are incorporated herein by reference.

FIELD

The present application relates to the technical field of handling equipment, and in particular to a pallet truck.

BACKGROUND

Pallet trucks are widely used in the field of warehousing.

Pallets have been widely used in many aspects of production and life, and have various specifications and models. Even standard pallets have many different opening dimensions, different working heights, and so on. For many non-standard pallets, the situation is more complicated.

The distance between forks of a common pallet truck is not adjustable. As mentioned above, the specifications and models of the pallets to be carried are complicated, which leads to the diversification of the pallet trucks. In many occasions of production and life, a variety of pallet trucks are required to meet the actual needs, which leads to increased costs and is harmful to unified management.

In addition, characteristics of the equipment, like the service life, ease of operation and the like, are also needed to be considered when designing the pallet truck.

SUMMARY

A pallet truck is provided according to the present application, which has an adjustable fork distance and a long service life, and the operation thereof is convenient and reliable.

According to an aspect of the present application, a pallet truck is provided, which includes a drive wheel and a front frame supported by the drive wheel, wherein an upper portion of the drive wheel is further provided with a lifting component, and a lifting end of the lifting component is connected to a rear frame;

front ends of two fork bodies arranged at left and right are slidably connected to the rear frame by a fork-distance adjusting device which is laterally arranged, and a side-shifting driving component is provided between the rear frame and each of the fork bodies;

a bottom of a rear end of each of the fork bodies is provided with a load-bearing wheel assembly, and a transmission device is provided between the load-bearing wheel assembly and the front frame and the rear frame; and wherein, when the lifting component drives the rear frame to move to a predetermined first position, the transmission device drives the load-bearing wheel assembly to be in a lateral rolling state; and when the lifting component drives the rear frame to move to a predetermined second position, the transmission device drives the load-bearing wheel assembly to be in a longitudinal rolling state.

According to an aspect of the present application, the transmission device includes:

a rear connecting rod assembly, installed on the rear frame and in parallel with the fork-distance adjusting device, and rotatably connected to the front frame by a first swing arm perpendicular to the rear connecting rod assembly; and a push rod assembly, wherein the push rod assembly is perpendicular to the rear connecting rod assembly, and has a rear end connected to the load-bearing wheel assembly and a front end slidably connected to a push rod shaft arranged in parallel with the rear connecting rod assembly, and the rear connecting rod assembly is rotatably connected to the push rod shaft by a second swing arm perpendicular to the rear connecting rod assembly.

According to an aspect of the present application, a position-limiting block is provided between each of the fork bodies and the respective push rod assembly for eliminating a lateral clearance between the fork body and the respective push rod assembly, to drive the respective push rod assembly to move laterally via the position-limiting block.

According to an aspect of the present application, the fork-distance adjusting device includes two guide bars provided at an upper portion and a lower portion of the rear frame respectively, a front end of each fork body is provided with a mounting vertical plate fixed to the fork body, and the mounting vertical plate is provided with two sliding bushings at positions corresponding to the guide bars and in sliding fit with the guide bars.

According to an aspect of the present application, the fork-distance adjusting device includes four slider-rail devices mounted on the rear frame, each slider-rail device includes a slider and a slide rail, and the front end of the fork body is fixedly provided with a mounting vertical plate, one of the slider and the slide rail is fixedly connected to the rear frame, and the other of the slider and the slide rail is fixedly connected to the respective mounting vertical plate of the fork body.

According to an aspect of the present application, the side-shifting driving component is a side-shifting oil cylinder, and two ends of the side-shift oil cylinder are respectively installed on the rear frame and the respective mounting vertical plate.

According to an aspect of the present application, one drive wheel is provided, the drive wheel is rotatably mounted below a middle of the front frame, and an auxiliary support wheel is arranged below each of two sides of the front frame.

According to an aspect of the present application, the load-bearing wheel assembly includes:

a front wheel fork, rotatably mounted on the bottom of the rear end of the respective fork body and rotatable around a wheel fork rotation axis;

a load-bearing wheel, rotatably mounted on a rear end of the front wheel fork, and a rotation axis of the load-bearing wheel being in parallel with the wheel fork rotation axis;

a side-shifting wheel frame, rotatably connected to the front wheel fork and rotatable around a wheel frame rotating shaft, wherein the wheel frame rotating shaft is located at a rear side of the wheel fork rotation axis and is in parallel with the wheel fork rotation axis;

a side-shifting wheel, rotatably mounted on a rear end of the side-shifting wheel frame, wherein a rotating shaft of the side-shift wheel is perpendicular to the wheel frame rotating shaft; and an elastic component, arranged between the front wheel fork and the side-shifting wheel frame, and configured to allow the side-shifting wheel frame to have a tendency of turning upward around the wheel frame rotating shaft towards the front wheel fork; and wherein, a position-limiting component is arranged on the front wheel fork and is configured to prevent an angle between the side-shifting wheel frame and the front wheel fork from being further reduced when the angle between the side-shifting wheel frame and the front wheel fork is reduced to a predetermined angle; and wherein a front end of the front wheel fork is rotatably connected to a rear end portion of the respective push rod assembly, to allow the front wheel fork to be rotatable about the wheel fork rotation axis when being driven by the push rod assembly; and a bottom of the side-shifting wheel is lower than a bottom of the load-bearing wheel when the push rod assembly reaches a rearmost end of a stroke.

According to an aspect of the present application, the side-shifting wheel frame is further provided with a guide roller, the guide roller is located at a rear end of the side-shifting wheel, and a rotating shaft of the guide roller is in parallel with the wheel frame rotating shaft.

According to an aspect of the present application, a rotation axis of the load-bearing wheel with respect to the front wheel fork coincides with the wheel frame rotating shaft.

According to an aspect of the present application, the position-limiting component is a position-limiting protrusion integrally formed on an upper edge of the front wheel fork, and an upper edge of the side-shifting wheel frame is provided with a position-limiting face for abutting against the position-limiting protrusion at the predetermined angle.

The pallet truck provided by the present application can adjust the distance between the fork bodies by using the side-shifting driving component, thereby providing different fork distances and significantly improving the adaptability. During the adjusting process, the transmission device can switch the load-bearing wheel assembly from the longitudinal rolling state to the lateral rolling state, thereby avoiding wear of the wheels, which is beneficial to improving the overall life of the device and reducing the maintenance cost. In addition, the transmission device is pushed out as the rear frame is lifted, and thus the operation process is simple and reliable.

BRIEF DESCRIPTION OF THE DRAWINGS

For more clearly illustrating embodiments of the present application or the technical solutions in the conventional technology, drawings referred to describe the embodiments or the conventional technology will be briefly described hereinafter. Apparently, the drawings in the following description are only some examples of the present application, and for those skilled in the art, other drawings may be obtained based on these drawings without any creative efforts.

DETAILED DESCRIPTION OF THE EMBODIMENTS

The technical solutions according to the embodiments of the present application will be described clearly and completely as follows in conjunction with the drawings of the embodiments of the present application. It is obvious that the described embodiments are only a part of the embodiments according to the present application, rather than all the embodiments. Any other embodiments obtained by those skilled in the art based on the embodiments of the present application without any creative work fall within the scope of protection of the present application.

A pallet truck is provided according to the present application, which has an adjustable fork distance and a long service life, and the operation thereof is convenient and reliable.

Figure 1:
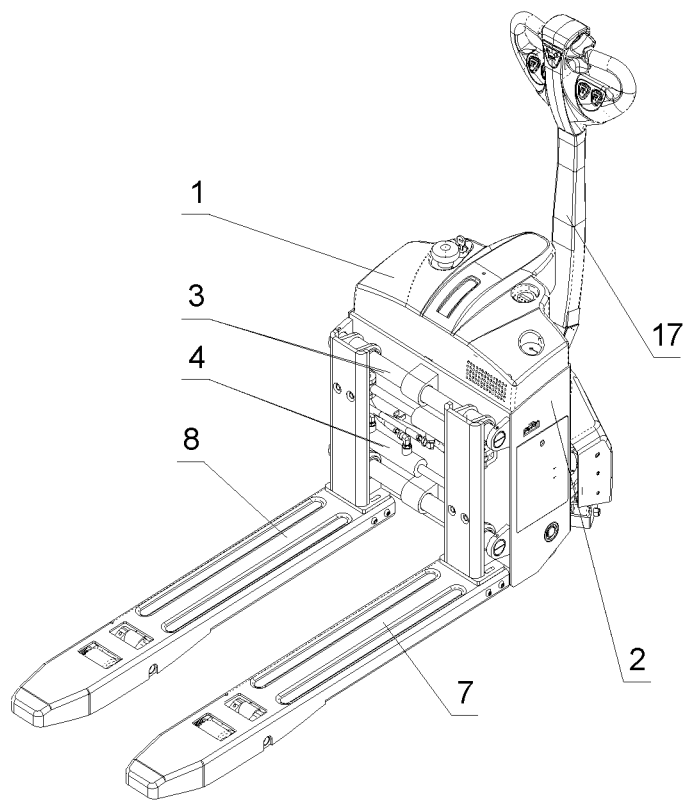
FIG. 1 is a schematic view showing the overall structure of a pallet truck according to an embodiment of the present application.
Figure 2:
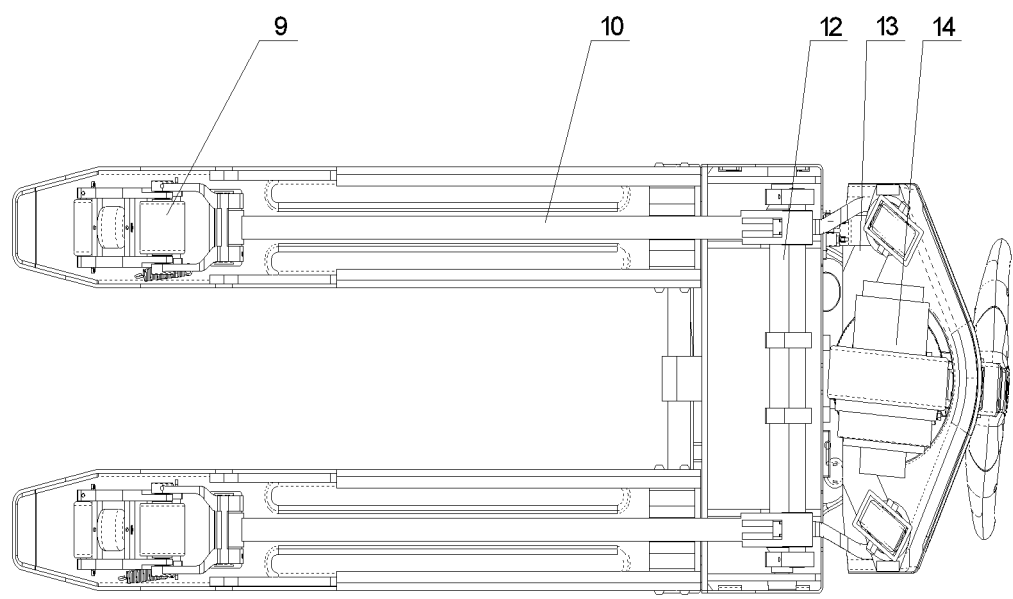
FIG. 2 is a bottom view of the pallet truck shown in FIG. 1.
Figure 3:
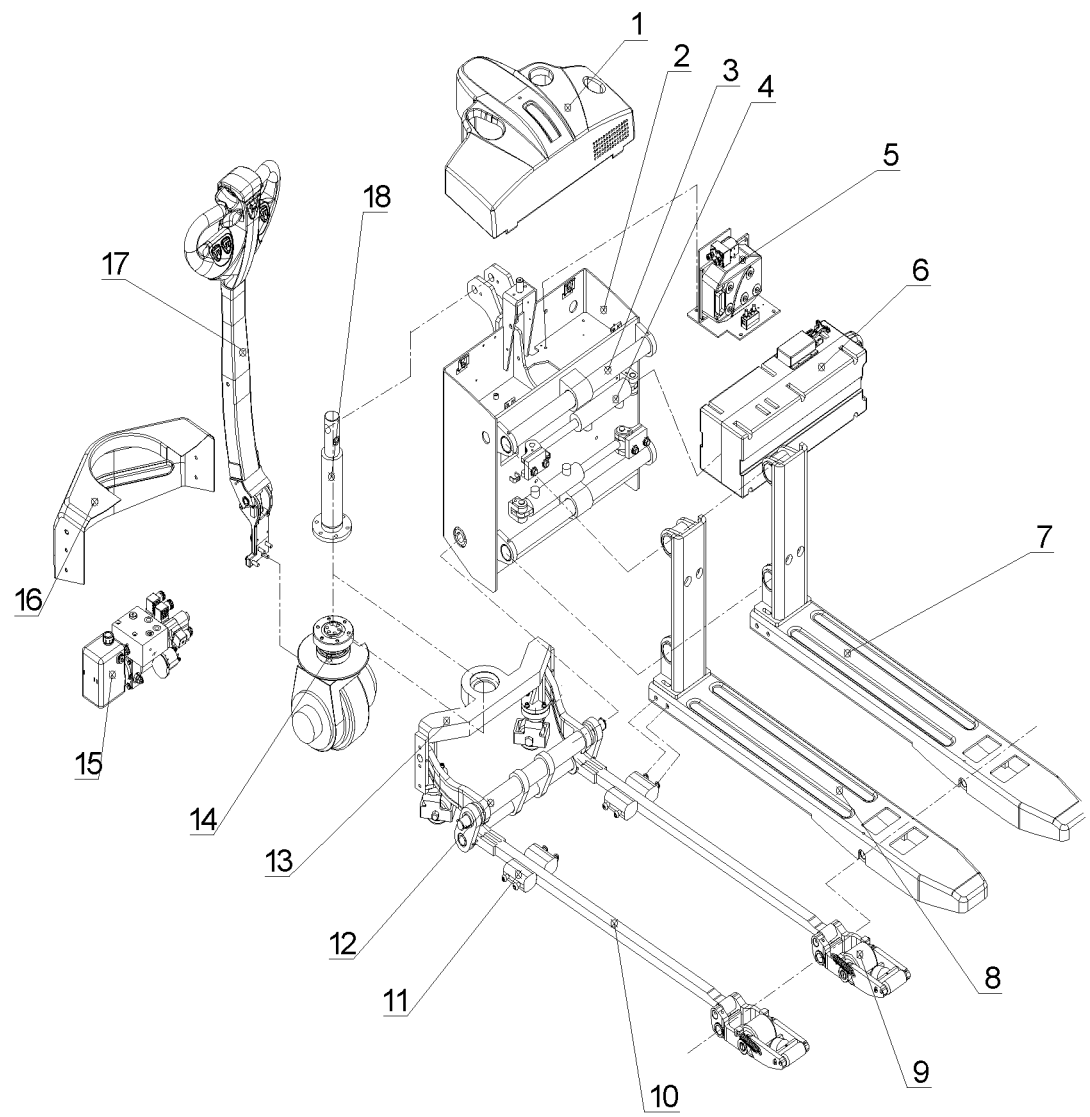
FIG. 3 is a schematic exploded view of the pallet truck shown in FIG. 1.
Figure 4:
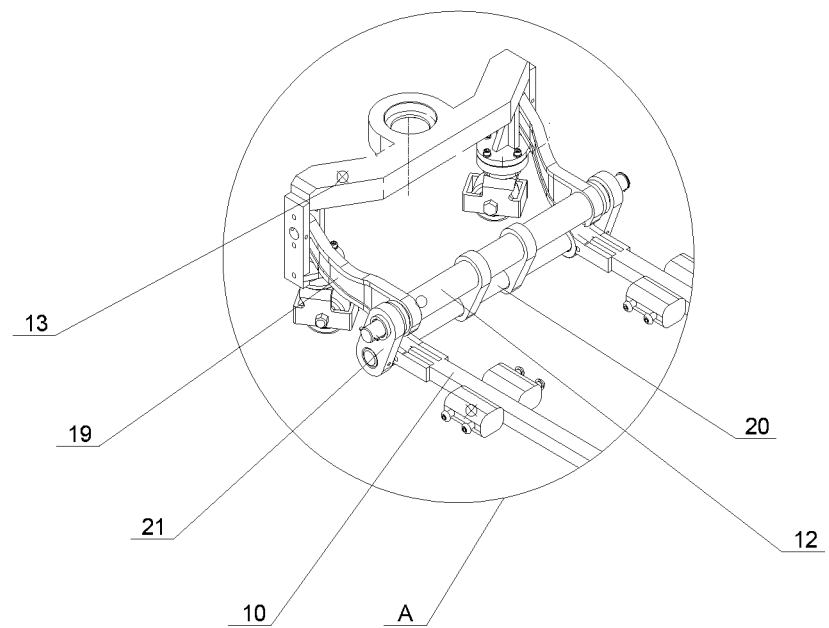
FIG. 4 is a partially enlarged view of a portion A in FIG. 3.
Figure 5:
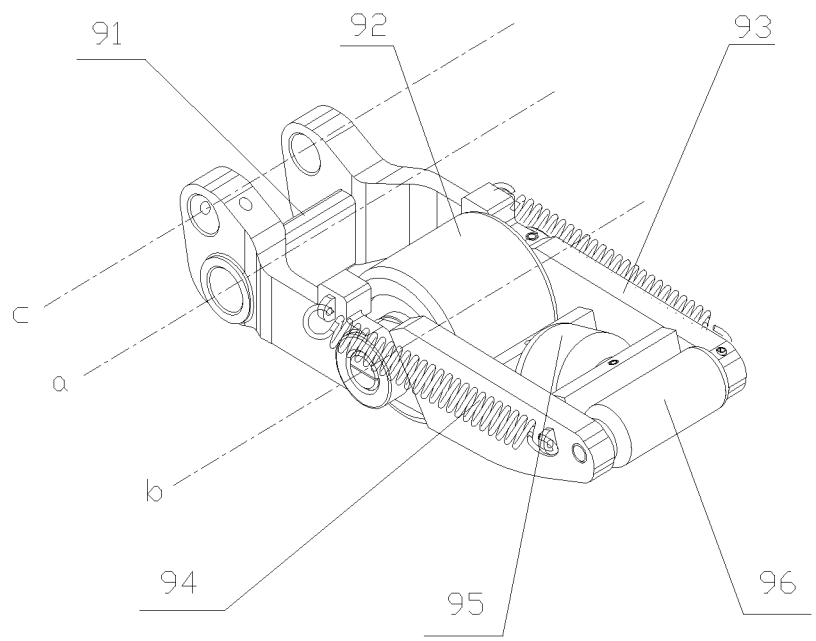
FIG. 5 is a perspective view showing the structure of a load-bearing wheel assembly in FIG. 1.

Referring to FIGS. 1 to 4, FIG. 1 is a schematic view showing the overall structure of a pallet truck according to an embodiment of the present application; FIG. 2 is a bottom view of the pallet truck shown in FIG. 1; FIG. 3 is a schematic exploded view of the pallet truck shown in FIG. 1; and FIG. 4 is a partially enlarged view of a portion A in FIG. 3.

In a first embodiment, the overall structure of the pallet truck provided by the present application includes a steering system 17, a drive wheel 14 and a wheel cover 16. The drive wheel 14 can provide support for a front end of the device. The number of the drive wheel 14 may be one as shown in FIGS. 2 and 3, or may be more.

The drive wheel 14 supports a front frame 13, and the drive wheel 14 and the front frame 13 can rotate relative to each other. In a case that only one drive wheel 14 is provided, the drive wheel 14 may be provided in the middle of the front frame 13. In addition, an auxiliary support wheel may be arranged below each of two sides of the front frame 13, and the auxiliary support wheel may be a universal wheel.

An upper portion of the drive wheel 14 is further provided with a lifting component 18, which may be a vertically arranged oil cylinder or other power component such as a screw rod. A lifting end of the lifting component 18 is connected to a rear frame 2 through a laterally arranged pin shaft, to drive the rear frame 2 to vertically ascend or descend, and during the ascending or descending process, the rear frame 2 can rotate about the laterally arranged pin shaft by an appropriate angle with respect to the lifting component 18.

The rear frame 2 may be provided with a hood 1, and may further support associated components such as an electric control assembly 5, an accumulator 6, and a hydraulic unit 15.

The pallet truck provided by the present application further includes a fork-distance adjusting device, and the detailed structure of the fork-distance adjusting device can be arranged flexibly as long as it can adjust the fork distance, and one of the structures will be described hereinafter in detail.

Referring to FIGS. 1-4, the fork-distance adjusting device may be embodied as a laterally arranged guide bar 3. The rear frame 2 is provided with a laterally arranged guide bar 3, and the number of the guide bar 3 may be one or more.

As shown in the figures, the rear frame 2 is provided with two guide bars 3 at an upper portion and a lower portion respectively, a front end of each fork body is fixedly provided with a mounting vertical plate, and the mounting vertical plate is provided with two sliding bushings at positions corresponding to the two guide bars 3 and in sliding fit with the two guide bars 3. Such connection is more stable and reliable.

The pallet truck has two fork bodies including a left fork 7 and a right fork 8. Although the current pallet truck generally has two fork bodies, it does not exclude other forms of structure such as a pallet truck with triple forks in the future. As long as the pallet truck has two fork bodies, it falls within the scope of protection of the present application, whether or not it has other structure.

Front ends of the left fork 7 and the right fork 8 are slidably connected to the rear frame 2 via the guide bars 3, and in particular, multiple sliding bushings that can cooperate with the guide bars 3 may be fixedly mounted at the front ends of the two forks.

The term "front end" used herein refers to an end where the steering system 17 is located in FIG. 4, and the term "rear end" refers to an end where a load-bearing wheel assembly 9 is located in FIG. 4.

A side-shifting driving component 4 is provided between the rear frame 2 and the left fork 7, and a side-shifting driving component 4 is also provided between the rear frame 2 and the right fork 8. The side-shifting driving component 4 may be an oil cylinder, a motor, or a screw rod or other driving member. As shown in the figures, the side-shifting driving component 4 is a side-shifting oil cylinder, and two ends thereof are respectively mounted to the rear frame 2 and the respective mounting vertical plate. The respective mounting vertical plate described herein is a connecting component provided at the front end of the respective fork body for connecting the side-shifting driving component 4.

A transmission device is arranged between the load-bearing wheel assembly 9 at the bottom of a rear end of each fork body and the front frame 13 and the rear frame 2. A specific structure of the transmission device can be flexibly configured as long as the structure can change the states of the load-bearing wheel assembly 9. One structure will be described in detail hereinafter.

The rear frame 2 is provided with a rear connecting rod assembly 12, and the rear connecting rod assembly 12 is arranged in parallel with the guide bars 3. The rear connecting rod assembly 12 may be rotatably connected to the front frame 13 via first swing arms 19, and the first swing arms 19 are perpendicular to the rear connecting rod assembly 12. As the rear frame 2 ascends and descends, the rear connecting rod assembly 12 can perform circular motions with the first swing arms 19 as a radius.

The rear ends of the left fork 7 and the right fork 8 are each provided with the load-bearing wheel assembly 9. The load-bearing wheel assembly 9 is connected to a push rod assembly 10. The push rod assembly 10 is arranged perpendicular to the rear connecting rod assembly 12, and a front end of the push rod assembly 10 is slidably connected to a push rod shaft 20. The push rod shaft 20 and the rear connecting rod assembly 12 are arranged in parallel with each other, and are rotatably connected to each other by second swing arms 21. The second swing arms 21 are arranged perpendicular to the rear connecting rod assembly 12.

A position-limiting block 11 is provided between the left fork 7 and the respective push rod assembly 10, and a position-limiting block 11 is provided between the right fork 8 and the respective push rod assembly 10. The material of the push rod assembly 10 may be nylon, rubber, polyurethane or the like. The position-limiting blocks 11 may be installed on inner sides of the left fork 7 and the right fork 8, such that the push rod assemblies 10 can be appropriately clamped from both sides, thereby eliminating the lateral clearances between the respective forks and the push rod assemblies 10, such that the left fork 7 and the right fork 8 can drive the push rod assemblies 10 to move laterally by the position-limiting blocks 11.

Values of parameters, such as lengths of the first swing arms 19, the second swing arms 21, the push rod assemblies 10, and lifting height of the lifting component 18, can be reasonably chosen by those skilled in the art based on common knowledge associated with the wheel train and in combination with specific circumstances, so that the rear frame 2 can be driven to ascend and slightly rotate around the laterally arranged pin shaft relative to the lifting component 18, when the lifting component 18 is rising, and at this time, the rear frame 2 drives the rear connecting rod assembly 12 to move to a predetermined first position, for example, a high position, and the rear connecting rod assembly 12 is also appropriately lifted. In this process, the first swing arms 19 generate an appropriate angular change relative to the front frame 13, and the second swing arms 21 generate an appropriate angular change relative to the push rod assemblies 10, and such joint action ultimately causes the push rod assemblies 10 to be pushed out toward the rear end. Similarly, when the lifting component 18 is descending, the rear frame 2 drives the rear connecting rod assembly 12 to move to the predetermined second position, for example, a lower position, and the above joint action ultimately causes the push rod assemblies 10 to retract toward the front end.

The left fork 7 and the right fork 8 can move in a longitudinal direction, that is, a direction from the front end to the rear end or from the rear end to the front end, and also can move in a lateral direction, that is, in a direction perpendicular to the longitudinal direction. The load-bearing wheel assemblies 9 have a lateral rolling state (that is, a state in which the left fork 7 and the right fork 8 move in the lateral direction) and a longitudinal rolling state (that is, the left fork 7 and the right fork 8 move in the longitudinal direction). The push rod assemblies 10 are pushed out or retracted along the longitudinal direction, and can drive the load-bearing wheel assemblies 9 to switch between the lateral rolling state and the longitudinal rolling state.

The pallet truck provided by the present application can adjust the distance between the fork bodies by using the side-shifting driving component, thereby providing different fork distances and significantly improving the adaptability. During the adjusting process, the push rod assemblies can switch the load-bearing wheel assemblies from the longitudinal rolling state to the lateral rolling state, thereby avoiding wear of the wheels, and facilitating improving the overall life of the device and reducing the maintenance cost. In addition, as the rear frame ascends, the push rod assemblies are pushed out by the first swing arms, the rear connecting rod assembly, the second swing arms, and the push rod shaft, and the operation process is simple and reliable.

A variety of specific transmission forms can be employed to switch the load-bearing wheel assemblies 9 between the lateral rolling state and the longitudinal rolling state.

For example, rollers can be mounted at the rear ends of the fork bodies through vertical mounting shafts, and the switch between the lateral rolling state and the longitudinal rolling state can be realized by rotating the rollers around the vertical mounting shafts by about 90 degrees. More specifically, a ring gear may be fixed on an outer periphery of each of the vertical mounting shafts, and a rack for engaging the ring gear is arranged at the rear end of each of the push rod assemblies 10. As the push rod assemblies 10 are pushed out and retracted, the racks can correspondingly drive the ring gears to reciprocally rotate, thereby driving the vertical mounting shafts to rotate, and changing the rolling direction of the rollers.

Other transmission forms can be employed to switch the load-bearing wheel assemblies 9 between the lateral rolling state and the longitudinal rolling state. For example, a motor is configured to perform a set action triggered by a stroke position of the push rod assemblies 10, thereby driving the ring gears to rotate.

However, compared to the specific implementation means described above, the implementation means described in detail below can achieve better technical effects.

Figure 6:
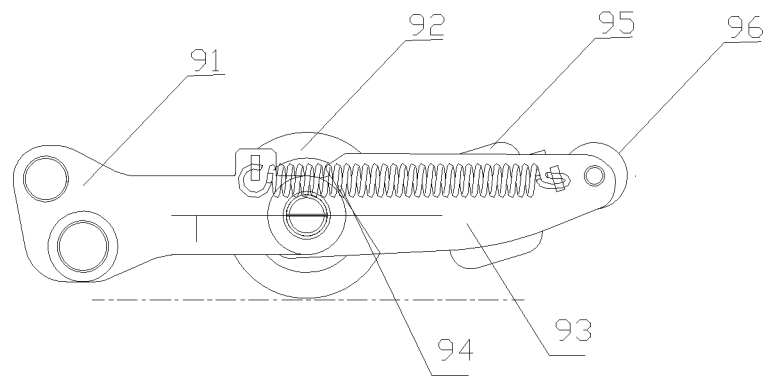
FIG. 6 is a schematic view showing an initial state of the load-bearing wheel assembly in FIG. 5.
Figure 7:
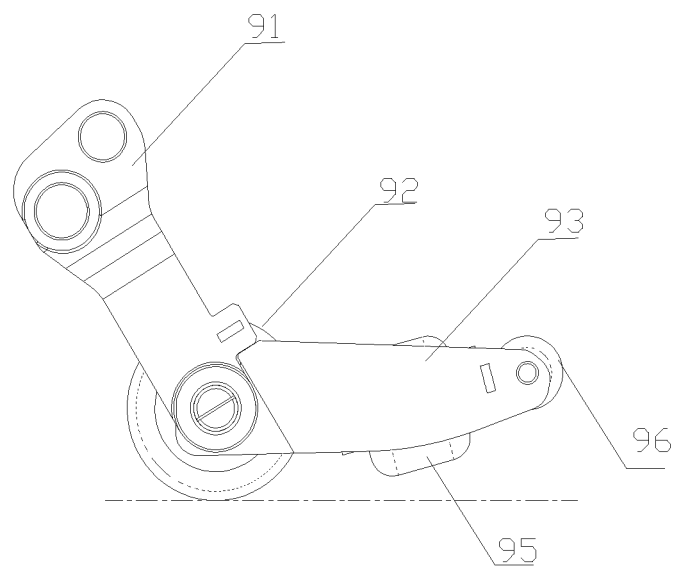
FIG. 7 is a schematic view showing a bearing state of the load-bearing wheel assembly in FIG. 5.
Figure 8:
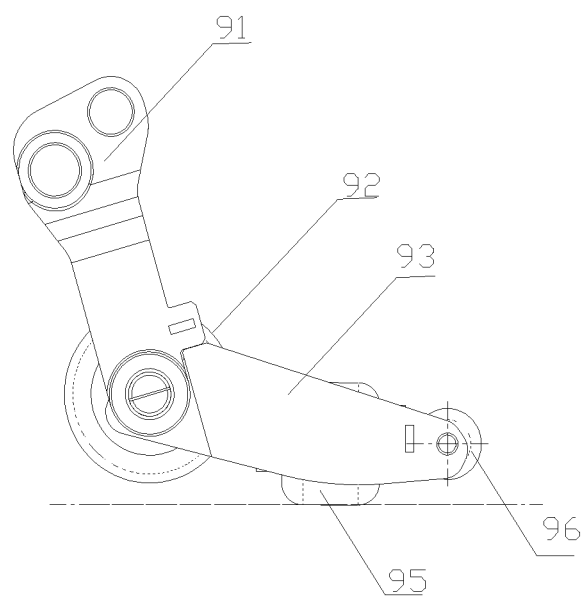
FIG. 8 is a schematic view showing a side-shifting state of the load-bearing wheel assembly in FIG. 5.

Referring to FIGS. 5 to 8, FIG. 5 is a perspective view showing the structure of the load-bearing wheel assembly in FIG. 1; FIG. 6 is a schematic view showing an initial state of the load-bearing wheel assembly in FIG. 5; FIG. 7 is a schematic view showing a bearing state of the load-bearing wheel assembly in FIG. 5; and FIG. 8 is a schematic view showing a side-shifting state of the load-bearing wheel assembly in FIG. 5.

In this embodiment, each load-bearing wheel assembly 9 includes a front wheel fork 91 and a side-shifting wheel frame 93, the front wheel fork 91 is mounted at the bottom of the rear end of the respective fork body (that is, the left fork 7 or the right fork 8), and the front wheel fork 91 is rotatable around a wheel fork axis a relative to the fork body. Further, a load-bearing wheel 92 is rotatably installed on the front wheel fork 91, the load-bearing wheel 92 is located at a rear end of the front wheel fork 91 (relative to the wheel fork axis a), and a rotation axis of the load-bearing wheel 92 is in parallel with the wheel fork axis a.

The side-shifting wheel frame 93 is rotatably connected to the front wheel fork 91 around a wheel frame rotating shaft b, the wheel frame rotating shaft b is located at a rear side of the wheel fork axis a and is arranged in parallel with the wheel fork axis a. A side-shifting wheel 95 is rotatably installed on the side-shifting wheel frame 93, the side-shifting wheel 95 is located at a rear end of the side-shifting wheel frame 93 (relative to the wheel frame rotating shaft b), and a rotation axis of the side-shifting wheel 95 is perpendicular to the wheel frame rotating shaft b.

Two lateral plates may be arranged between two side plates of the side-shifting wheel frame 93, such that the side-shifting wheel 95 can be installed between the two lateral plates.

The rotation axis of the load-bearing wheel 92 with respect to the front wheel fork 91 may coincide with the wheel frame rotating shaft b, such that the structure is simpler and more reliable.

Further, an elastic member 94 is provided between the front wheel fork 91 and the side-shifting wheel frame 93, and the elastic member 94 has a tendency to contract, to allow the side-shifting wheel frame 93 to have a tendency of turning upward around the wheel frame rotating shaft b towards the front wheel fork 91.

The elastic member 94 may specifically be a tension spring.

The front wheel fork 91 is provided with a position-limiting component, so that the position-limiting component abuts against part of the side-shifting wheel frame 93 when the side-shifting wheel frame 93 rotates around the wheel frame rotating shaft b relative to the front wheel fork 91 and an angle between the side-shifting wheel frame 93 and the front wheel fork 91 is reduced to a predetermined angle, thereby preventing the angle from being further reduced.

The position-limiting component may specifically be a position-limiting protrusion integrally formed on an upper edge of the front wheel fork 91, and an upper edge of the side-shifting wheel frame 93 may be provided with a position-limiting face for abutting against the position-limiting protrusion at the predetermined angle.

A front end of the front wheel fork 91 (relative to the wheel fork axis a) is rotatably connected to a rear end portion of the push rod assembly 10. For example, a shaft hole may be provided in the front end of the front wheel fork 91, and the front end of the front wheel fork 91 can be connected to the push rod assembly 10 through a rotating pin, to be rotatable relative to a push rod axis c, such that the push rod assembly 10 can drive the front wheel fork 91 to rotate around the wheel fork axis a.

The state shown in FIG. 6 is taken as an initial state for description.

In a bearing state (as shown in FIG. 7), the push rod assembly 10 pushes the front wheel fork 91 to rotate clockwise around the wheel fork axis a, and the angle between the front wheel fork 91 and the side-shifting wheel frame 93 continuously decreases under an action of the tension spring, which maintains a distance between the side-shifting wheel 95 and the ground, and at this time, the load-bearing wheel 92 is descended to be supported by the ground.

In the side-shifting state (FIG. 8), the push rod assembly 10 continues to push the front wheel fork 91 to further rotate clockwise around the wheel fork axis a, and the angle between the front wheel fork 91 and the side-shifting wheel frame 93 has been reduced to the predetermined angle, and the position-limiting component has already abutted against part of the side-shifting wheel frame 93, thereby preventing the angle from being further reduced. At this time, the side-shifting wheel 95 will come into contact with the ground, and the load-bearing wheel 92 will be raised off the ground.

Before the angle between the front wheel fork 91 and the side-shifting wheel frame 93 reaches the minimum angle, the elastic component such as the tension spring will drive the rear end of the side-shifting wheel frame 95 to abut against the inner side of the fork body.

In order to reduce wear and smooth the operation, a guide roller 96 may be provided. The guide roller 96 is installed on the side-shifting wheel frame 93 and is located at the rear end of the side-shifting wheel 95, and a rotation axis of the guide roller 96 is in parallel with the wheel frame rotating shaft b.

Figure 9:
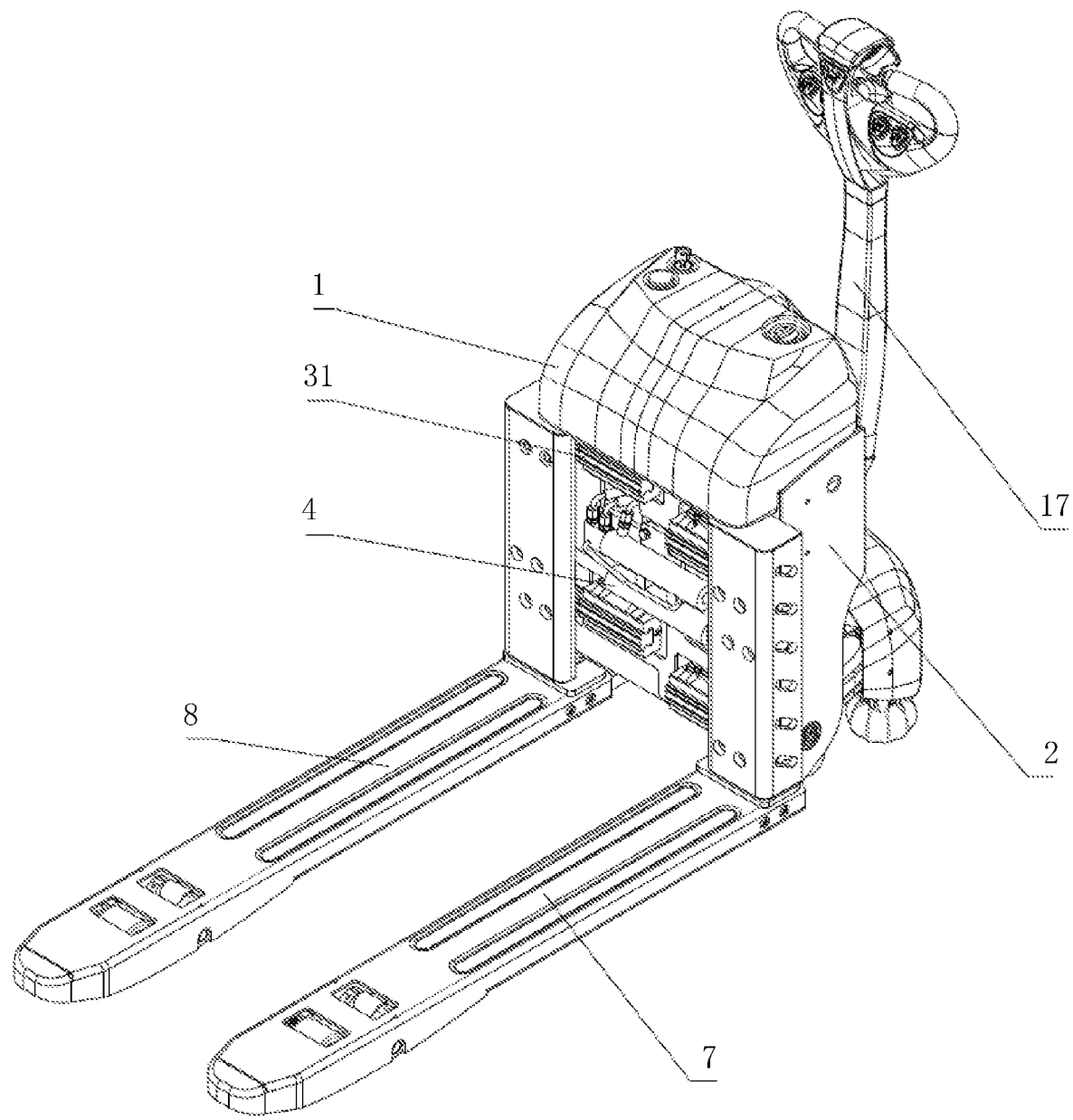
FIG. 9 is a schematic view showing the overall structure of a pallet truck according to another embodiment of the present application.
Figure 10:
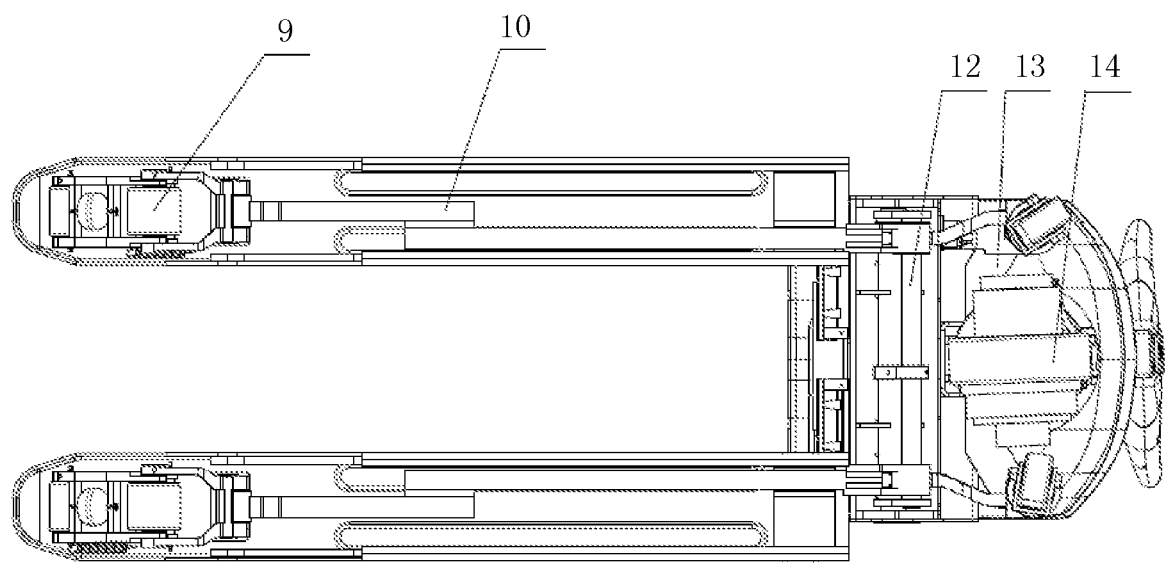
FIG. 10 is a bottom view of the pallet truck shown in FIG. 9.
Figure 11:
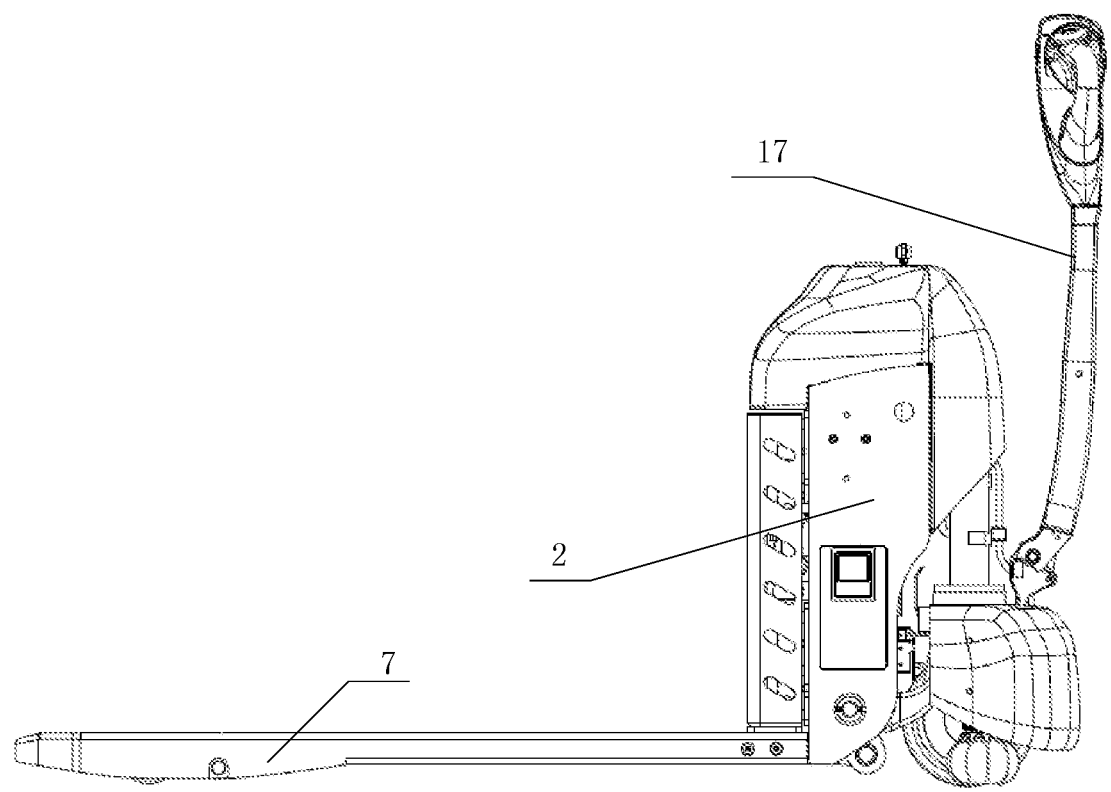
FIG. 11 is a side view of the pallet truck shown in FIG. 9.
Figure 12:
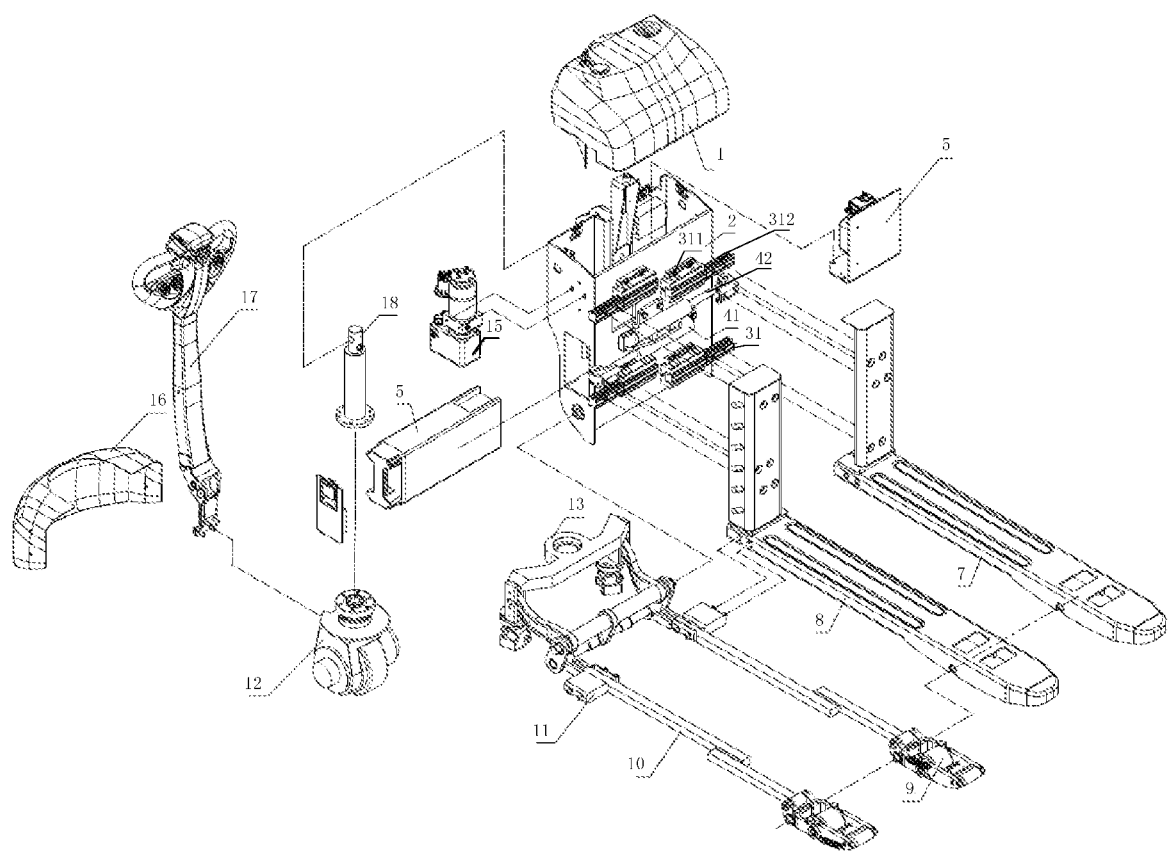
FIG. 12 is a schematic exploded view of the pallet truck shown in FIG. 9.

Reference is made to FIGS. 9-12, FIG. 9 is a schematic view showing the overall structure of a pallet truck according to another embodiment of the present application; FIG. 10 is a bottom view of the pallet truck shown in FIG. 9; FIG. 11 is a side view of the pallet truck shown in FIG. 9; and FIG. 12 is a schematic exploded view of the pallet truck shown in FIG. 9.

The only difference between this embodiment and the above embodiment is the structure of the fork-distance adjusting device, which will be specifically described below. In this embodiment, the same or similar components adopt the same reference numerals as the above embodiment.

The fork-distance adjusting device is embodied as a slider-rail device 31. The slider-rail device 31 is mounted on the rear frame 2, and the number of the slider-rail device 31 can be one or more.

In this embodiment, four slider-rail devices 31 are described as an example. Four slider-rail devices 31 which are laterally arranged are mounted on the rear frame 2, two of the four slider-rail devices 31 at the left, which are arranged at an upper portion and a lower portion of the rear frame 2, correspond to the left fork 7; and two of the four slider-rail devices 31 at the right, which are arranged at the upper portion and the lower portion of the rear frame 2, correspond to the right fork 8.

It can be understood by those skilled in the art that, it is also applicable by providing only two slider-rail devices 31 which are arranged at the upper portion and the lower portion of the rear frame 2 and respectively correspond to the left fork 7 and the right fork 8; of course, it is also applicable by providing only two slider-rail devices 31 which are arranged at the left and right of the rear frame 2, and the slider-rail device 31 at the left corresponds to the left fork 7 and the slider-rail device 3 at the right corresponds to the right fork 8. The number and setting mode of the slider-rail device 3 can be adjusted according to specific application scenarios.

Each slider-rail device 31 includes a slider 311 and a slide rail 312, one of the slider 311 and the slide rail 322 is fixedly connected to the rear frame 2, and the other of the slider 311 and the slide rail 322 is fixedly connected to the respective fork body.

Referring to FIG. 9, the solution of the sliders 311 being connected to the rear frame 2 is described as an example. The sliders 311 are fixedly connected to the rear frame 2, and the fixed connection may be realized by bolts, screws or other means, which is not limited herein. The slider rails 312 are fixedly connected to the left fork 7 and the right fork 8, respectively, and the fixed connection may be realized by bolts, screws or other means. Specifically, the slide rails 312 are fixedly coupled to the mounting vertical plates of the left fork 7 and the right fork 8, respectively.

A side-shifting driving component 4 is provided between the rear frame 2 and the left fork 7, and a side-shifting driving component 4 is also provided between the rear frame 2 and the right fork 8. The side-shifting driving component 4 may be an oil cylinder, a motor, or a screw rod or other driving member. As shown in the figures, the side-shifting driving component 4 is a side-shifting oil cylinder, and two ends thereof are respectively mounted to the rear frame 2 and the respective mounting vertical plate. The respective mounting vertical plate described herein is a connecting component provided at the front end of the respective fork body for connecting the side-shifting driving component 4.

The position of the side-shifting driving component 4 may be arranged according to the application scenarios, and as shown in the drawings, it is arranged at the middle of the four slider-rail device 31.

Specifically, the side shift driving members 4 are each embodied as an oil cylinder, and bodies 41 of the oil cylinders 4 are fixed to the rear frame 2, and piston rods 42 of the oil cylinders 4 are connected to the left fork 7 and the right fork 8, respectively. Under the action of the expansion and contraction force of the cylinders, the left fork 7 and the right fork 8 are pushed to translate left and right along the slide rail to realize the distance adjustment function of the fork.

The above embodiments in the specification are described in a progressive manner. Each of the embodiments is mainly focused on describing its differences from other embodiments, and references may be made among these embodiments with respect to the same or similar portions among these embodiments.

The pallet truck according to the present application is described in detail hereinbefore. The principle and embodiments of the present application are described through specific examples herein. The description of the above embodiments is merely used to facilitate understanding the method and core idea of the present application. It should be noted that, for the person skilled in the art, some improvements and modifications may be made to the present application without departing from the principle of the present application, and these modifications and improvements are also deemed to fall within the scope of protection of the present application defined by the claims.

The invention claimed is:

1. A pallet truck, comprising a drive wheel and a front frame supported by the drive wheel, wherein an upper portion of the drive wheel is further provided with a lifting component, and a lifting end of the lifting component is connected to a rear frame;

front ends of two fork bodies arranged at left and right are slidably connected to the rear frame by a fork-distance adjusting device which is laterally arranged, and a side-shifting driving component is provided between the rear frame and each of the fork bodies;

a bottom of a rear end of each of the fork bodies is provided with a load-bearing wheel assembly, and a transmission device is provided between the load-bearing wheel assembly and the front frame and the rear frame; and wherein, when the lifting component drives the rear frame to move to a predetermined first position, the transmission device drives the load-bearing wheel assembly to be in a lateral rolling state; and when the lifting component drives the rear frame to move to a predetermined second position, the transmission device drives the load-bearing wheel assembly to be in a longitudinal rolling state, wherein the transmission device comprises:
a rear connecting rod assembly, installed on the rear frame and in parallel with the fork-distance adjusting device, and rotatably connected to the front frame by a first swing arm perpendicular to the rear connecting rod assembly; and
a push rod assembly, wherein the push rod assembly is perpendicular to the rear connecting rod assembly, and has a rear end connected to the load-bearing wheel assembly and a front end slidably connected to a push rod shaft arranged in parallel with the rear connecting rod assembly, and the rear connecting rod assembly is rotatably connected to the push rod shaft by a second swing arm perpendicular to the rear connecting rod assembly.

2. The pallet truck according to claim 1, wherein a position-limiting block is provided between each of the fork bodies and the respective push rod assembly for eliminating a lateral clearance between the fork body and the respective push rod assembly, to drive the respective push rod assembly to move laterally via the position-limiting block.

3. The pallet truck according to claim 2, wherein the fork-distance adjusting device includes two guide bars provided at an upper portion and a lower portion of the rear frame respectively, a front end of each fork body is provided with a mounting vertical plate fixed to the fork body, and the mounting vertical plate is provided with two sliding bushings at positions corresponding to the guide bars and in sliding fit with the guide bars.

4. The pallet truck according to claim 3, wherein the side-shifting driving component is a side-shifting oil cylinder, and two ends of the side-shift oil cylinder are respectively installed on the rear frame and the respective mounting vertical plate.

5. The pallet truck according to claim 2, wherein the fork-distance adjusting device comprises four slider-rail devices mounted on the rear frame, each slider-rail device includes a slider and a slide rail, and the front end of the fork body is fixedly provided with a mounting vertical plate, one of the slider and the slide rail is fixedly connected to the rear frame, and the other of the slider and the slide rail is fixedly connected to the respective mounting vertical plate of the fork body.

6. The pallet truck according to claim 5, wherein the side-shifting driving component is a side-shifting oil cylinder, and two ends of the side-shift oil cylinder are respectively installed on the rear frame and the respective mounting vertical plate.

7. The pallet truck according to claim 3, wherein the load-bearing wheel assembly comprises:
a front wheel fork, rotatably mounted on the bottom of the rear end of the respective fork body and rotatable around a wheel fork rotation axis;
a load-bearing wheel, rotatably mounted on a rear end of the front wheel fork, and a rotation axis of the load-bearing wheel being in parallel with the wheel fork rotation axis;
a side-shifting wheel frame, rotatably connected to the front wheel fork and rotatable around a wheel frame rotating shaft, wherein the wheel frame rotating shaft is located at a rear side of the wheel fork rotation axis and is in parallel with the wheel fork rotation axis;
a side-shifting wheel, rotatably mounted on a rear end of the side-shifting wheel frame, wherein a rotating shaft of the side-shift wheel is perpendicular to the wheel frame rotating shaft; and
an elastic component, arranged between the front wheel fork and the side-shifting wheel frame, and configured to allow the side-shifting wheel frame to have a tendency of turning upward around the wheel frame rotating shaft towards the front wheel fork; and
wherein, a position-limiting component is arranged on the front wheel fork and is configured to prevent an angle between the side-shifting wheel frame and the front wheel fork from being further reduced when the angle between the side-shifting wheel frame and the front wheel fork is reduced to a predetermined angle; and
wherein a front end of the front wheel fork is rotatably connected to a rear end portion of the respective push rod assembly, to allow the front wheel fork to be rotatable about the wheel fork rotation axis when being driven by the push rod assembly; and a bottom of the side-shifting wheel is lower than a bottom of the load-bearing wheel when the push rod assembly reaches a rearmost end of a stroke.

8. The pallet truck according to claim 5, wherein the load-bearing wheel assembly comprises:
a front wheel fork, rotatably mounted on the bottom of the rear end of the respective fork body and rotatable around a wheel fork rotation axis;
a load-bearing wheel, rotatably mounted on a rear end of the front wheel fork, and a rotation axis of the load-bearing wheel being in parallel with the wheel fork rotation axis;
a side-shifting wheel frame, rotatably connected to the front wheel fork and rotatable around a wheel frame rotating shaft, wherein the wheel frame rotating shaft is located at a rear side of the wheel fork rotation axis and is in parallel with the wheel fork rotation axis;
a side-shifting wheel, rotatably mounted on a rear end of the side-shifting wheel frame, wherein a rotating shaft of the side-shift wheel is perpendicular to the wheel frame rotating shaft; and
an elastic component, arranged between the front wheel fork and the side-shifting wheel frame, and configured to allow the side-shifting wheel frame to have a tendency of turning upward around the wheel frame rotating shaft towards the front wheel fork; and
wherein, a position-limiting component is arranged on the front wheel fork and is configured to prevent an angle between the side-shifting wheel frame and the front wheel fork from being further reduced when the angle between the side-shifting wheel frame and the front wheel fork is reduced to a predetermined angle; and
wherein a front end of the front wheel fork is rotatably connected to a rear end portion of the respective push rod assembly, to allow the front wheel fork to be rotatable about the wheel fork rotation axis when being driven by the push rod assembly; and a bottom of the side-shifting wheel is lower than a bottom of the load-bearing wheel when the push rod assembly reaches a rearmost end of a stroke.

9. The pallet truck according to claim 1, wherein one drive wheel is provided, the drive wheel is rotatably mounted below a middle of the front frame, and an auxiliary support wheel is arranged below each of two sides of the front frame.

10. The pallet truck according to claim 1, wherein the load-bearing wheel assembly comprises:
a front wheel fork, rotatably mounted on the bottom of the rear end of the respective fork body and rotatable around a wheel fork rotation axis;

a load-bearing wheel, rotatably mounted on a rear end of the front wheel fork, and a rotation axis of the load-bearing wheel being in parallel with the wheel fork rotation axis;

a side-shifting wheel frame, rotatably connected to the front wheel fork and rotatable around a wheel frame rotating shaft, wherein the wheel frame rotating shaft is located at a rear side of the wheel fork rotation axis and is in parallel with the wheel fork rotation axis;

a side-shifting wheel, rotatably mounted on a rear end of the side-shifting wheel frame, wherein a rotating shaft of the side-shift wheel is perpendicular to the wheel frame rotating shaft; and an elastic component, arranged between the front wheel fork and the side-shifting wheel frame, and configured to allow the side-shifting wheel frame to have a tendency of turning upward around the wheel frame rotating shaft towards the front wheel fork; and wherein, a position-limiting component is arranged on the front wheel fork and is configured to prevent an angle between the side-shifting wheel frame and the front wheel fork from being further reduced when the angle between the side-shifting wheel frame and the front wheel fork is reduced to a predetermined angle; and wherein a front end of the front wheel fork is rotatably connected to a rear end portion of the respective push rod assembly, to allow the front wheel fork to be rotatable about the wheel fork rotation axis when being driven by the push rod assembly; and a bottom of the side-shifting wheel is lower than a bottom of the load-bearing wheel when the push rod assembly reaches a rearmost end of a stroke.

11. The pallet truck according to claim 10, wherein the side-shifting wheel frame is further provided with a guide roller, the guide roller is located at a rear end of the side-shifting wheel, and a rotating shaft of the guide roller is in parallel with the wheel frame rotating shaft.

12. The pallet truck according to claim 10, wherein a rotation axis of the load-bearing wheel with respect to the front wheel fork coincides with the wheel frame rotating shaft.

13. The pallet truck according to claim 10, wherein the position-limiting component is a position-limiting protrusion integrally formed on an upper edge of the front wheel fork, and an upper edge of the side-shifting wheel frame is provided with a position-limiting face for abutting against the position-limiting protrusion at the predetermined angle.

14. The pallet truck according to claim 1, wherein the load-bearing wheel assembly comprises:
a front wheel fork, rotatably mounted on the bottom of the rear end of the respective fork body and rotatable around a wheel fork rotation axis;
a load-bearing wheel, rotatably mounted on a rear end of the front wheel fork, and a rotation axis of the load-bearing wheel being in parallel with the wheel fork rotation axis;
a side-shifting wheel frame, rotatably connected to the front wheel fork and rotatable around a wheel frame rotating shaft, wherein the wheel frame rotating shaft is located at a rear side of the wheel fork rotation axis and is in parallel with the wheel fork rotation axis;
a side-shifting wheel, rotatably mounted on a rear end of the side-shifting wheel frame, wherein a rotating shaft of the side-shift wheel is perpendicular to the wheel frame rotating shaft; and
an elastic component, arranged between the front wheel fork and the side-shifting wheel frame, and configured to allow the side-shifting wheel frame to have a tendency of turning upward around the wheel frame rotating shaft towards the front wheel fork; and
wherein, a position-limiting component is arranged on the front wheel fork and is configured to prevent an angle between the side-shifting wheel frame and the front wheel fork from being further reduced when the angle between the side-shifting wheel frame and the front wheel fork is reduced to a predetermined angle; and
wherein a front end of the front wheel fork is rotatably connected to a rear end portion of the respective push rod assembly, to allow the front wheel fork to be rotatable about the wheel fork rotation axis when being driven by the push rod assembly; and a bottom of the side-shifting wheel is lower than a bottom of the load-bearing wheel when the push rod assembly reaches a rearmost end of a stroke.

15. The pallet truck according to claim 14, wherein the side-shifting wheel frame is further provided with a guide roller, the guide roller is located at a rear end of the side-shifting wheel, and a rotating shaft of the guide roller is in parallel with the wheel frame rotating shaft.

16. The pallet truck according to claim 14, wherein the position-limiting component is a position-limiting protrusion integrally formed on an upper edge of the front wheel fork, and an upper edge of the side-shifting wheel frame is provided with a position-limiting face for abutting against the position-limiting protrusion at the predetermined angle.

17. The pallet truck according to claim 2, wherein the load-bearing wheel assembly comprises:
a front wheel fork, rotatably mounted on the bottom of the rear end of the respective fork body and rotatable around a wheel fork rotation axis;
a load-bearing wheel, rotatably mounted on a rear end of the front wheel fork, and a rotation axis of the load-bearing wheel being in parallel with the wheel fork rotation axis;
a side-shifting wheel frame, rotatably connected to the front wheel fork and rotatable around a wheel frame rotating shaft, wherein the wheel frame rotating shaft is located at a rear side of the wheel fork rotation axis and is in parallel with the wheel fork rotation axis;
a side-shifting wheel, rotatably mounted on a rear end of the side-shifting wheel frame, wherein a rotating shaft of the side-shift wheel is perpendicular to the wheel frame rotating shaft; and
an elastic component, arranged between the front wheel fork and the side-shifting wheel frame, and configured to allow the side-shifting wheel frame to have a tendency of turning upward around the wheel frame rotating shaft towards the front wheel fork; and
wherein, a position-limiting component is arranged on the front wheel fork and is configured to prevent an angle between the side-shifting wheel frame and the front wheel fork from being further reduced when the angle between the side-shifting wheel frame and the front wheel fork is reduced to a predetermined angle; and
wherein a front end of the front wheel fork is rotatably connected to a rear end portion of the respective push rod assembly, to allow the front wheel fork to be rotatable about the wheel fork rotation axis when being driven by the push rod assembly; and a bottom of the side-shifting wheel is lower than a bottom of the load-bearing wheel when the push rod assembly reaches a rearmost end of a stroke.

18. The pallet truck according to claim 17, wherein the side-shifting wheel frame is further provided with a guide roller, the guide roller is located at a rear end of the side-shifting wheel, and a rotating shaft of the guide roller is in parallel with the wheel frame rotating shaft.

19. The pallet truck according to claim 17, wherein the position-limiting component is a position-limiting protrusion integrally formed on an upper edge of the front wheel fork, and an upper edge of the side-shifting wheel frame is provided with a position-limiting face for abutting against the position-limiting protrusion at the predetermined angle.

\* \* \* \* \*